Nov. 10, 1959     L. J. RASERO     2,912,016
INDICATOR TAPE
Filed March 4, 1957
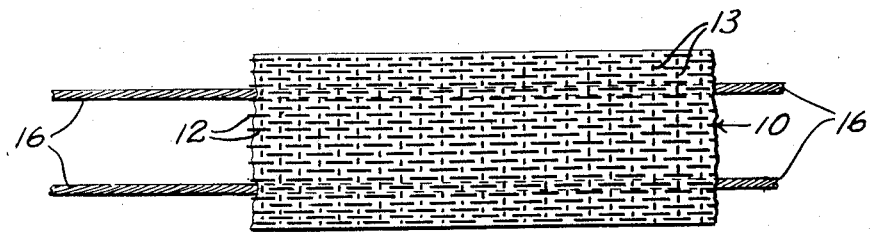
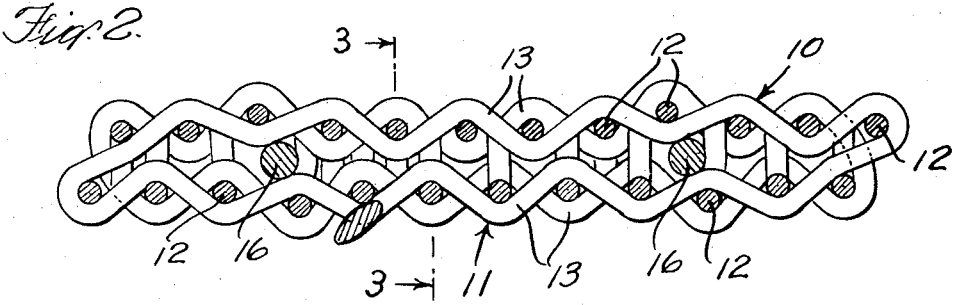
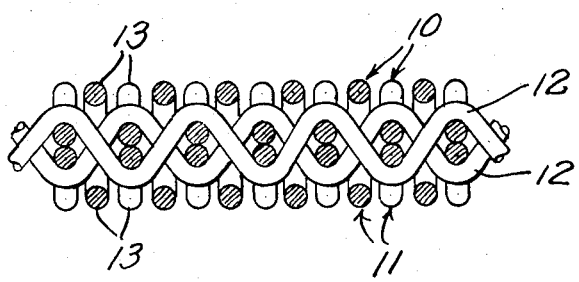
INVENTOR
LAWRENCE J. RASERO
BY
ATTORNEY United States Patent Office 2,912,016
Patented Nov. 10, 1959

2,912,016
INDICATOR TAPE

Lawrence J. Rasero, Middletown, Conn., assignor to The Russell Manufacturing Company, Middletown, Conn., a corporation of Connecticut Application March 4, 1957, Serial No. 643,567

4 Claims. (Cl. 139—425)

This invention relates to indicator tape for detecting leakage in high temperature vessels, piping or the like, and has for an object to provide a tape of the above type which may be used in inaccessible locations for indicating at a remote point any failure or leakage of such vessels.

Another object is to provide a tape of the above type which may be used on objects which are subject to high temperature and vibration.

Various other objects and advantages will be apparent as the nature of the invention is more fully disclosed.

The present invention provides a pair of electrical conductors of a material which will withstand high temperatures and which are woven with ceramic yarn into a flat tape by which they are held separated and insulated during normal operation. The tape is of sufficient porosity to permit the conductors to be short circuited by any fluid which leaks from the vessel or piping around which the tape is wrapped.

The tape is formed of a yarn composed of a blend containing ceramic fibers which will withstand the high temperatures involved and a filler or carrier which facilitates spinning and weaving but is carbonizable at high temperatures.

In accordance with the present invention a yarn is spun from a blend of ceramic fibers such as aluminum silicate containing about equal proportions of alumina silica and a filler such as wire, glass, cotton, Dacron, nylon, or the like, which assist in the spinning of the ceramic fibers but do not in themselves withstand high temperatures. A two-ply tape of flattened tubular form is woven from this yarn with the conducting strands bound between the plies at spaced points.

A tape of the above type is readily handled and may be wrapped around the pipe or vessel to be protected. When this tape is subjected to high temperatures while on the pipe or vessel, for example 2500° F. to 3000° F., the filler melts or carbonizes and burns away leaving only the ceramic fibers which hold the metal conductors in place and provide the necessary insulation. Due to the burning away of the filler fibers the tape becomes porous so that any fluid, such as steam or hot chemicals, which escapes from the vessel or piping readily permeates the tape and short circuits the two conductors to produce an indication at a remote point. Although the spun ceramic fibers which remain may have but little tensile strength they are self-supporting and will retain the conductors in place for a long period of use.

The nature of the invention will be better understood by referring to the following description taken in connection with the accompanying drawing in which a specific embodiment thereof has been set forth for purposes of illustration.

In the drawing:

Fig. 1 is a broken elevation of a tape according to the invention;

Fig. 2 is a transverse section through the tape of Fig. 1 on a much larger scale showing the nature of the weave; and Fig. 3 is a section taken on the line 3—3 of Fig. 2.

Referring to the drawing more in detail the tape is shown as comprising an upper ply 10 and a lower ply 11, said plies being composed of warpwise yarns 12 and fillerwise chains 13. The fillerwise chains 13 are shown as comprising a pair of yarns which extend alternately above and below adjacent warpwise yarns 12 in both the upper and the lower plies, said fillerwise yarns 13 being joined at the ends to form a flat tubular structure within which a pair of stranded electric conductors 16 are disposed in parallel spaced relationship. These conductors may be made of a metal capable of withstanding high temperatures such as Iconel-X or stainless steel.

As shown in Fig. 3 the warpwise yarns 12 extend alternately into the upper ply 10 and the lower ply 11 to bind the two plies together, one such warpwise yarn being disposed on each side of the electric conductors 16, as shown in Figs. 1 and 2, so as to secure the conductors in spaced parallel relationship. The arrangement is such that each conductor is completely surrounded by said yarns and is insulated thereby from contact with exterior objects.

It is to be understood that the yarns 12 and 13 are composed of a blend of ceramic and combustible fibers as above described, the blend when spun forming a yarn having sufficient tensile strength to provide a permanent support for the conductors.

When the tape thus produced is wrapped around the pipe or vessel to be protected and subjected to a high temperatures the combustible fibers carbonize and burn off leaving only the ceramic fibers which provide sufficient support to insulate the conductors and hold them in place.

The porosity of the weave plus the porosity produced by removal of the combustible fibers renders the tape readily permeable by any fluids which escape from the vessel. The fluid contacts and short circuits the conductors to produce a remote indication when the conductors are connected to a suitable electric indicating circuit.

What is claimed is:

1. A high temperature indicator tape comprising upper and lower plies of fabric woven from spun yarn consisting of a blend of ceramic fibers and combustible fibers and a pair of uninsulated electric conductors of a material resistant to high temperatures disposed between said plies in spaced parallel relationship, and yarns of said blend securing said conductors in place and binding said plies together.

2. A high temperature indicator tape comprising a fabric tape in flattened tubular form having a pair of uninsulated spaced parallel electric conductors of a material resistant to high temperatures disposed therein, said fabric being woven from spun yarn consisting of a blend of ceramic fibers and combustible fibers, said yarn binding said conductors in place, said ceramic fibers forming a porous structure after removal of said combustible fibers.

3. An indicator tape as set forth in claim 2 in which said ceramic fibers are composed of aluminum silicate.

4. An indicator tape as set forth in claim 2 in which said conductors are composed of stainless steel.

References Cited in the file of this patent

UNITED STATES PATENTS

| | | |
|---|---|---|
| 362,010 | Jewill | Apr. 26, 1887 |
| 1,938,668 | Schneider et al. | Dec. 12, 1933 |
| 2,133,237 | Slayter | Oct. 11, 1938 |
| 2,207,579 | Carl | July 9, 1940 |
| 2,223,737 | Moses | Dec. 3, 1940 |
| 2,260,024 | Hall et al. | Oct. 21, 1941 |
| 2,816,415 | Lappala | Dec. 17, 1957 |